United States Patent [19]

Kobashi et al.

[11] 4,303,977

[45] Dec. 1, 1981

[54] METHOD FOR CONTROLLING IGNITION ENERGY IN AN INTERNAL COMBUSTION ENGINE

[75] Inventors: Mamoru Kobashi; Toshihisa Ogawa, both of Aichi, Japan

[73] Assignee: Toyota Jidosha Kogyo Kabushiki Kaisha, Toyota, Japan

[21] Appl. No.: 84,081

[22] Filed: Oct. 12, 1979

[30] Foreign Application Priority Data

Oct. 17, 1978 [JP] Japan .............................. 53-126862

[51] Int. Cl.3 .......................... F02P 9/00; G06F 15/20

[52] U.S. Cl. .................................... 364/431; 123/416; 123/609; 123/644

[58] Field of Search ................ 364/431; 123/415, 416, 123/417, 418, 609, 610, 644

[56] References Cited

U.S. PATENT DOCUMENTS

| | | | |
|---|---|---|---|
| 3,797,471 | 3/1974 | Schuette | 123/609 |
| 3,939,811 | 2/1976 | Sasayama | 123/416 X |
| 4,044,733 | 8/1977 | Suda | 123/610 |
| 4,051,822 | 10/1977 | Yoshida | 123/416 |
| 4,117,819 | 10/1978 | Jarrett et al. | 123/609 |
| 4,121,556 | 10/1978 | Bigliani et al. | 123/610 |
| 4,157,699 | 6/1979 | Mori | 123/417 |
| 4,176,645 | 12/1979 | Jundt et al. | 123/609 |
| 4,196,705 | 4/1980 | Hattori et al. | 123/416 |
| 4,198,936 | 4/1980 | Pagel et al. | 123/609 X |
| 4,230,078 | 10/1980 | Hattori et al. | 123/416 |
| 4,248,200 | 2/1981 | Sugiura et al. | 123/644 |

*Primary Examiner*—Felix D. Gruber

*Attorney, Agent, or Firm*—Kenyon & Kenyon

[57] ABSTRACT

A time period during which current is conducted through a primary winding of an ignition coil of an internal combustion engine is calculated in response to signals corresponding to an actual rotational speed of the engine and the magnitude of a power supply voltage which is applied to the primary winding, respectively. A time for initiating the primary winding current is controlled in accordance with the calculated time period. Such current is conducted for a maximum period of time, which is determined in response to the magnitude of the power supply voltage, so as to avoid excessive heat build-up in the ignition coil. The rotational speed of the engine is determined by counting clock signals during time intervals which correspond to predetermined angular segments of rotation.

5 Claims, 9 Drawing Figures

| Fig.2A | Fig.2B |
|---|---|

METHOD FOR CONTROLLING IGNITION ENERGY IN AN INTERNAL COMBUSTION ENGINE

BACKGROUND OF THE INVENTION

The present invention relates to a method for controlling the ignition energy in an internal combustion engine whereby the amount of ignition energy conducted to an ignition coil is stabilized while the problem of excess heat in the ignition coil is effectively reduced.

The conventional system for controlling the ignition energy supplied to an internal combustion engine utilizes a switch to supply current to a primary winding of an ignition coil during the time that a distributor crank shaft of the engine is rotated over a predetermined crank angle. In this simple system, the time period during which current is supplied to the primary winding of the ignition coil varies inversely with the rotational speed of the engine. Thus, as the rotational speed of the engine is increased, the time period during which current is conducted through the primary winding is shortened, the ignition energy supplied to the engine decreases, and the ignition capacity is diminished. Conversely, when the rotational speed decreases, current through the primary winding is conducted over a longer time period and the ignition capacity increases. However, during low speed operation, the current is conducted over such a long period of time that excessive heat is generated in the ignition coil. Excessive heat is also produced in power transistors which are used in some conventional ignition systems to switch on and off the current which is supplied to the primary winding.

One known system which has been developed in an attempt to solve the above-mentioned problems utilizes electronic circuitry to control the current flowing through the primary winding of the ignition coil, so that the time period during which it flows is always held constant. However, this type of system produces ignition energy in an amount which disadvantageously varies in accordance with the voltage applied to the primary winding of the ignition coil. In general, the ignition energy is proportional to the square of the voltage applied to the ignition coil. Thus, if the voltage applied to the ignition coil changes from 6 V to 18 V, the ignition energy will increase by a factor of approximately eight or nine. Therefore, if the ignition coil is designed so that sufficient ignition energy is produced when a low voltage is applied to its primary winding, an excessive amount of harmful heat energy will be produced in the coil when the primary winding voltage becomes high.

It is, therefore, a primary object of the invention to provide an ignition energy control method for providing adequate ignition energy during high speed rotation of an engine, while reducing the amount of heat generated in an ignition coil during low speed rotation of the engine.

It is another object of the invention to provide an ignition energy control method which provides adequate ignition energy to the engine for a predetermined range of voltage applied to the primary winding of the ignition coil.

It is a further object of the invention to provide an ignition energy control method whereby ignition energy supplied to an engine can be controlled by using a digital computer having small storage capacity.

SUMMARY OF THE INVENTION

The foregoing and other objects are achieved by this invention which provides a method for controlling ignition energy in an internal combustion engine which includes the steps of generating a first electric signal which is rotational speed of the engine and a second electric signal being indicative of a supply voltage which is applied to a primary winding of an ignition coil of the engine. A time period during which current is conducted through the primary winding of the ignition coil is calculated based on the generated first and second electric signals. The time of the initiation of the flow of current through the primary winding of the ignition coil is controlled in accordance with the calculated time period.

The above and other related objects and features of the present invention will be apparent by reading the following description of the disclosure with reference to the accompanying drawings and the appended claims.

DETAILED DESCRIPTION OF THE INVENTION

Figure 1:
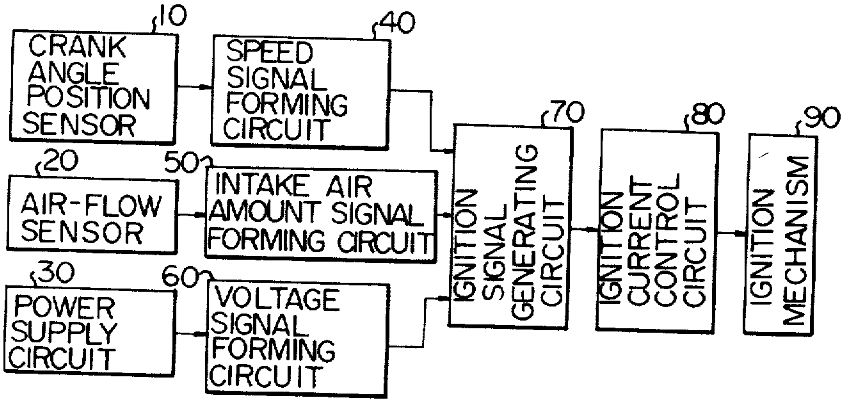
FIG. 1 is a schematic block diagram of an ignition control system according to the present invention.

FIG. 1 is a schematic block diagram illustrating an ignition control system in an embodiment according to the present invention. Crank angle position sensor 10 is fixed to an axle of a distributor of, for example, a four-cycle, six-cylinder internal combustion engine. The sensor 10 generates a predetermined number of pulse signals, illustratively six pulse signals, each of which have a pulse width corresponding to a predetermined crank angle $\theta_1$, per one revolution of the axle of the distributor at every predetermined crank angle position. A well-known air-flow sensor 20 is provided for generating an analog signal which indicates the amount of air sucked into the engine. A power supply circuit 30 generates a voltage which is applied to a primary winding of an ignition coil. The pulse signals from crank angle position sensor 10 are applied to a speed signal forming circuit 40 for generating a digital signal which indicates the rotational speed N of the engine. The generated digital speed signal is applied to an ignition timing signal generating circuit 70. The outputs from the air-flow sensor 20 and the power supply circuit 30 are converted into digital signals at an intake air amount signal forming circuit 50 and at a voltage signal forming circuit 60, respectively. The outputs of circuits 50 and 60 are applied to ignition signal generating circuit 70. An ignition signal from ignition signal generating circuit 70 is applied to an ignition current control circuit 80 which controls the ignition current transmitted into an ignition mechanism 90.

Figures 2, 2A:
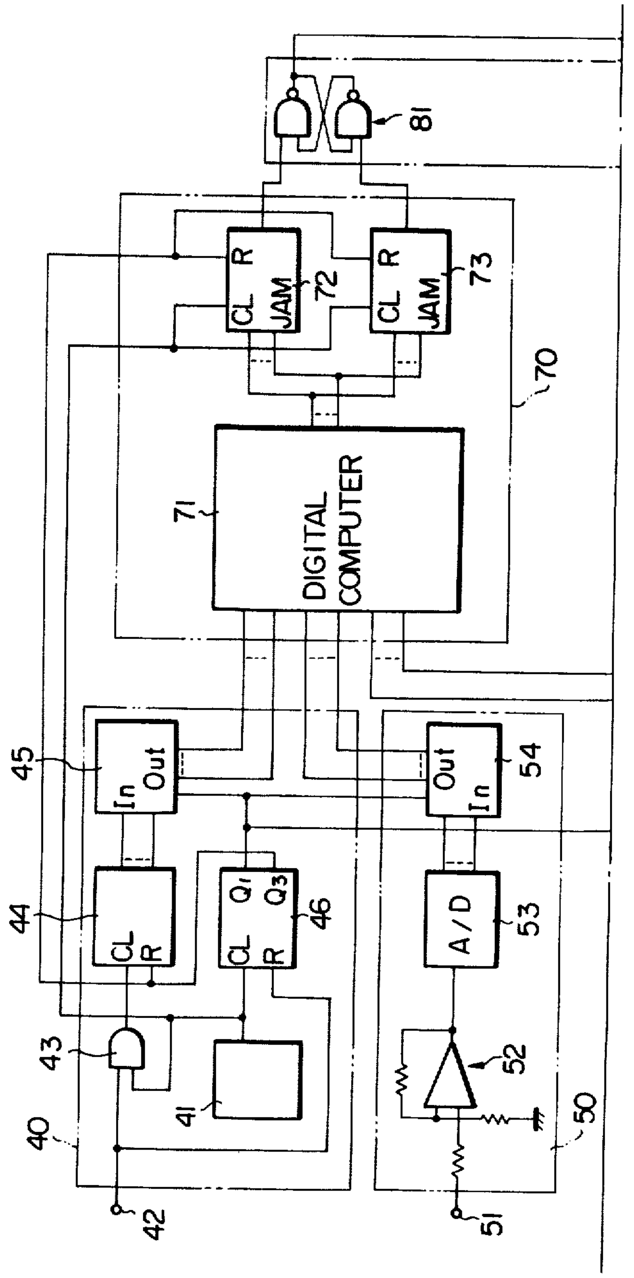
FIGS. 2A and 2B, taken together as FIG. 2, show a detailed block diagram of a part of the ignition control system illustrated in FIG. 1.
Figure 2B:
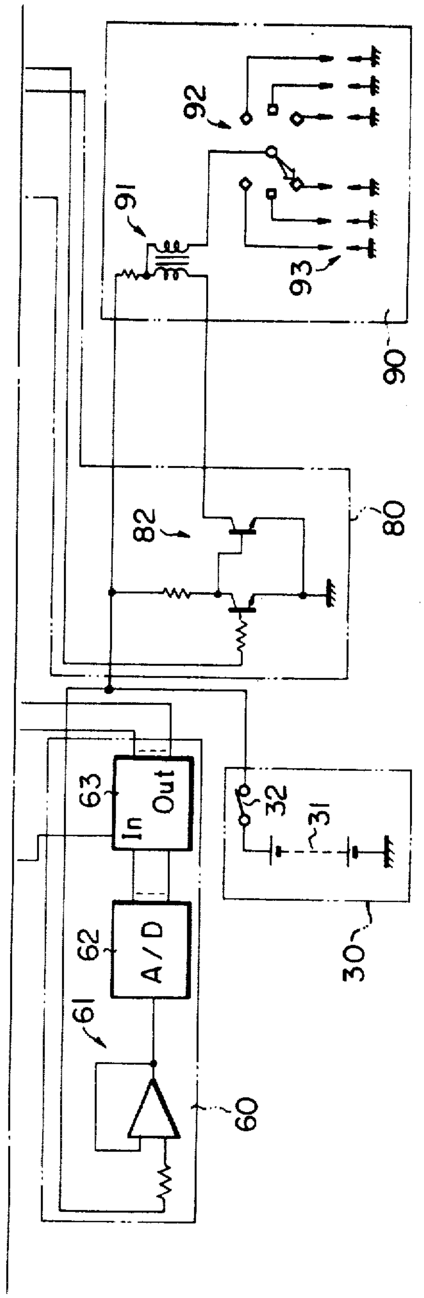

FIG. 2 is a detailed block diagram illustrating a part of the ignition control system of FIG. 1. As illustrated in FIG. 2, the speed signal forming circuit 40 comprises: a clock signal generator 41; an AND gate 43, to which clock pulses from generator 41 and pulse signals from crank angle position sensor 10 are conducted via an input terminal 42; a binary counter 44 which counts the number of clock pulses applied via AND gate 43; a latch circuit 45 which momentarily stores outputs of the binary counter 44; and a decade counter 46 for generating decade outputs which are used to control the reset timing of counter 44 and the input operation of data applied to latch circuit 45.

In this embodiment, binary counter 44 counts the number of clock pulses applied thereto while the pulse signal fed from the crank angle position sensor 10 is in a high logic state. In other words, a crank shaft of the engine rotates through a predetermined crank angle $\theta_1$, and then, latch circuit 45 stores the counter number of clock pulses in the counter 44 at every 120° of rotation of the crank. As a result, a rotational speed signal of the engine is formed by this speed signal forming circuit 40 three times for each revolution of the crank.

The intake air amount signal forming circuit 50 which generates a digital signal corresponding to the amount of air sucked into the engine, comprises: an amplifier 52 for amplifying the output analog signal from air-flow sensor 20 via an input terminal 51; an analog-digital converter (A/D converter) 53 for converting the amplified analog signal to a digital signal; and a latch circuit 54 for momentarily storing the converted digital signal at every 120° of rotation of the crank.

The power supply circuit 30 is composed of a battery 31 and an ignition switch 32.

The voltage signal forming circuit 60 comprises: an emitter-follower circuit 61 to which a voltage developed across the terminals of battery 31 is applied; an A/D converter 62 for converting the output of the circuit 61 to a digital signal; and a latch circuit 63 for momentarily storing the converted digital signal at every 120° of rotation of the crank. Therefore, circuit 60 forms a digital signal which corresponds to the voltage at the terminals of battery 31, which is applied to the primary winding of the ignition coil.

The ignition signal generating circuit 70 comprises: a digital computer 71 having a micro-processor and a read only memory (ROM) (not shown); a first presettable down-counter 72 for determining a time at which the current flowing to the ignition coil primary winding is discontinued, that is, for determining ignition timing; and a second presettable down-counter 73 for determining a time at which the current flowing to the ignition coil primary winding is initiated. The digital computer 71 calculates an optimum ignition timing based on the rotational speed signal and the intake air amount signal which are fed from the above-mentioned forming circuits 40 and 50, in accordance with a well-known algorithm. In addition, digital computer 71 calculates a time period $T_a$ required by the crank shaft for rotating from the predetermined crank angle position to a position of the calculated optimum ignition timing, and; thereafter, the digital computer 71 feeds the down-counter 72 with a digital signal having a value corresponding to the calculated time period $T_a$ divided by a period of clock pulses applied to down-counter 72. Furthermore, digital computer 71 calculates a time period $T_{on}$ (hereinafter called an "on-current" period) during which current flows through the ignition coil primary winding based on the above-mentioned rotational speed signal and on the voltage signal fed from the voltage signal forming circuit 60, by using a specific algebraic function described hereinafter. The digital computer then calculates a time period $T_{off}$ (hereinafter called an "off-current" period) during which current does not flow through ignition coil primary winding, from the calculated on-current period $T_{on}$. Thereafter, the computer 71 calculates a time period $T_b$ by adding the previously calculated time period $T_a$ and the calculated off-current period $T_{off}$, and then, feeds down-counter 73 a digital signal corresponding to the value of the calculated time period $T_b$ divided by a period of the clock pulses applied to down-counter 73.

The ignition current control circuit 80 comprises: a flip-flop 81 which is set and reset by output signals from the first and second down-counters 72 and 73, respectively, and a driving circuit 82 for controlling the conduction of a current from a battery 31 via an ignition switch 32 to a primary winding of ignition coil 91 in ignition mechanism 90, in accordance with an output signal from flip-flop 81.

The ignition mechanism 90 is comprised of a conventional ignition coil 91, a distributor 92 and spark plugs 93.

The operation of the present embodiment will now be described by referring to FIGS. 3 and 4.

Figure 3:
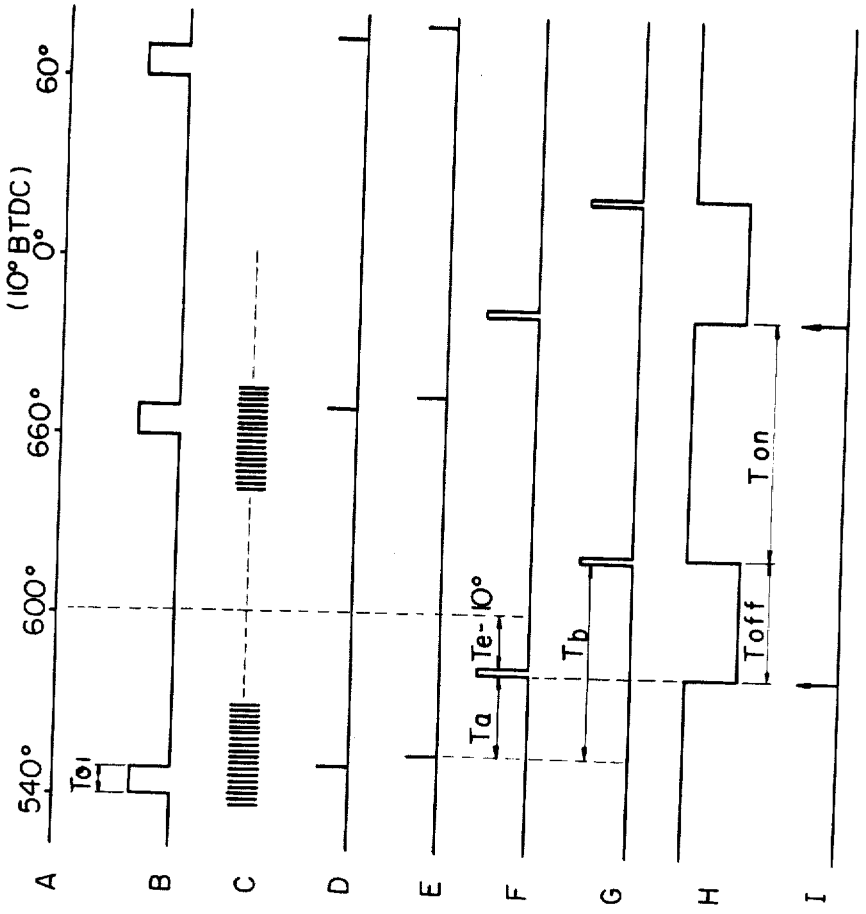
FIG. 3 is a diagram illustrating wave-forms obtained at various points in the ignition control system.
Figure 4:
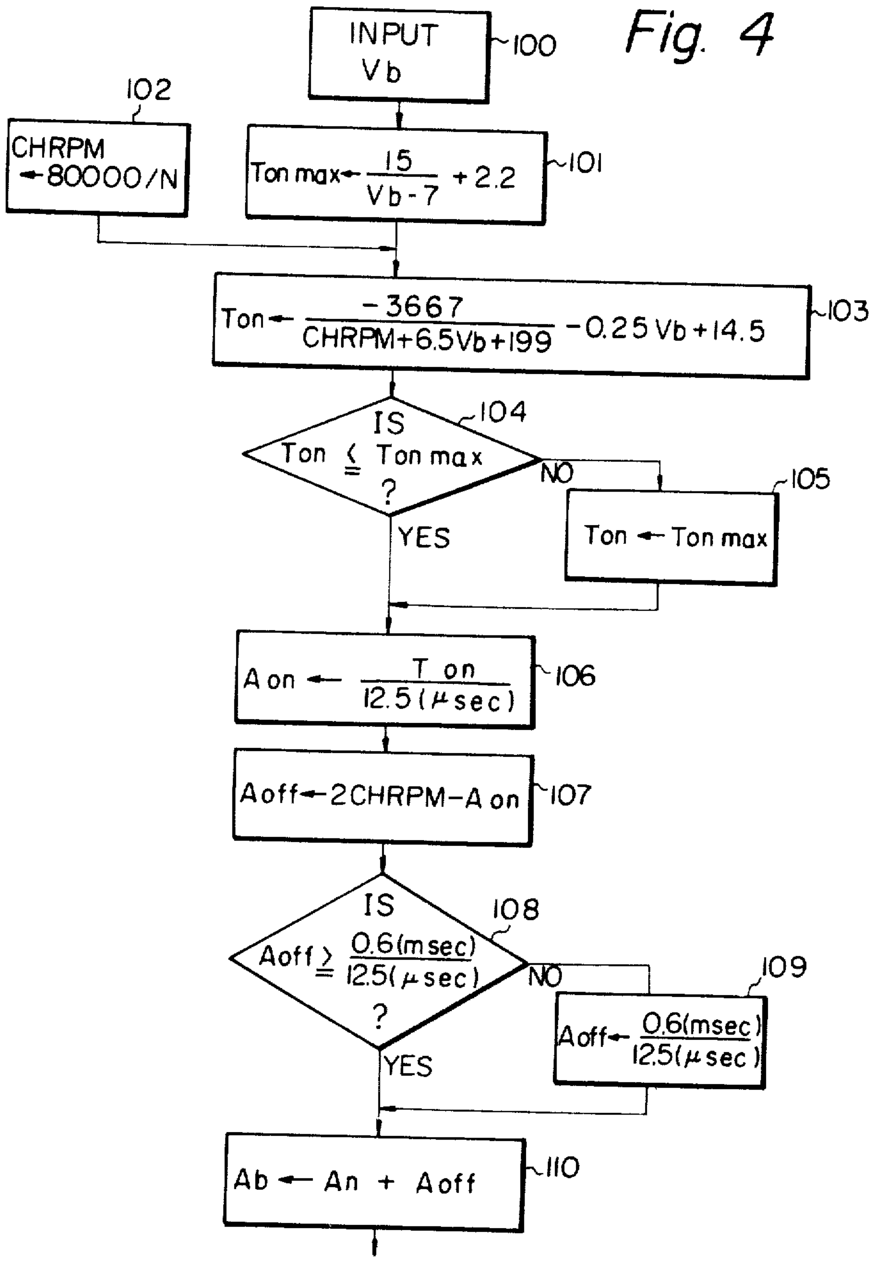
FIG. 4 is a flow diagram illustrating the operation of a digital computer in the ignition control system.

The crank angle position sensor 10 generates a standard pulse signal, as shown in FIG. 3-(B), at every crank angle position of 70° before top dead center (70° BTDC); in other words, at every standard crank angle position which appears at an interval of 120°. The pulse width $T_{\theta 1}$ of this standard pulse signal corresponds to a time period required by the crank shaft for rotating at a crank angle of $\theta_1$. Therefore, this pulse width $T_{\theta 1}$ maintains a fixed relationship with respect to the angle of rotation of the crank, but varies in time in accordance with the rotational speed of the engine.

FIG. 3-(A) shows a crank angle signal waveform relative to a position which corresponds to a position advanced 10° before top dead center of the first cylinder. Hereinafter, the operation of the present embodiment will be illustrated by using the above-mentioned crank angle shown in FIG. 3-(A).

As mentioned hereinbefore, the crank angle position sensor 10 generates a standard pulse signal having a pulse width of $T_{\theta 1}$ at each crank angle position of 60°, 180°, 300°, 420°, 540° and 660°. On the other hand, the clock signal generator 41 generates pulse signals with an interval of, for example, 12.5 μsec, as shown in FIG. 3-(C). The binary counter 44 counts the number of the clock pulse passing within a time period corresponding to the pulse width $T_{\theta 1}$ of the standard pulse signal. Therefore, the counted number of clock signals counter 44 is inversely proportional to the rotational speed of the engine.

The decade counter 46 is reset at the negative edge of the standard pulse signal, and then, counts the number of the above-mentioned clock pulses so that the decade outputs of the counter number appear at output terminals $Q_1$ to $Q_n$ thereof. FIG. 3-(D) and FIG. 3-(E) show the decade outputs appearing at the output terminals $Q_1$ and $Q_3$, respectively. The output of $Q_1$ is delayed from the negative edge of the standard pulse signal by one period of the clock pulse, and the output of $Q_3$ is delayed from the negative edge by three periods of the clock pulse. The output of $Q_1$ is used to transfer the counted number in the counter 44 to the latch circuit 45, and the output of $Q_3$ is used to reset the counter 44. Therefore, a new rotational speed signal is stored in the latch circuit 45 every time the standard pulse signal appears. Furthermore, since the output of $Q_1$ is also applied to the respective latch circuits 54 and 63 of the intake air amount signal forming circuit 50 and the voltage signal forming circuit 60, a new intake air amount signal and a new voltage signal are stored in the latch circuits 54 and 63 every time the standard pulse signal appears, respectively.

The digital computer 71 reads the data from the latch circuits 45, 54 and 63 in accordance with control signals, respectively, and then, carries out the calculation of an optimum ignition timing and of an optimum time period of supplying current to the ignition coil primary winding in accordance with a predetermined program.

Figure 5A:
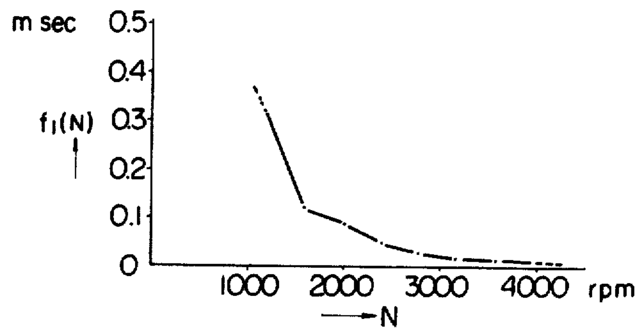
FIG. 5*a* is a graph of a function $f_1$ (N) versus rotational speed N of the engine.
Figure 5B:
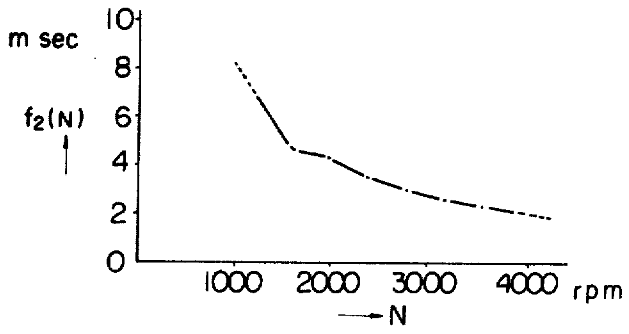
FIG. 5*b* is a graph of a function $f_2$ (N) versus rotational speed N of the engine.

The calculation of an optimum ignition timing can be accomplished by using various known algorithms. In one of the known algorithms of calculating an optimum ignition timing, functions $f_1(N)$ and $f_2(N)$ having specific relationships with respect to the rotational speed N(rpm) of the engine 99 shown in FIGS. 5a and 5b, respectively, are preliminarily stored in the ROM. The computer reads out values of the functions $f_1(N)$ and $f_2(N)$ from the ROM, in accordance with the actual rotational speed N(rpm) indicated by the rotational speed signal from the latch circuit 45. Then, the computer calculates an optimum spark-advance time period $T_e$ by using the above-mentioned values of functions $f_1(N)$ and $f_2(N)$, the amount Q(g/sec) of air sucked into the engine per second, which amount is indicated by the intake air amount signal from the latch circuit 54, and the following equation:

$$T_e = f_1(N)\cdot Q + f_2(N)$$

Figure 5C:
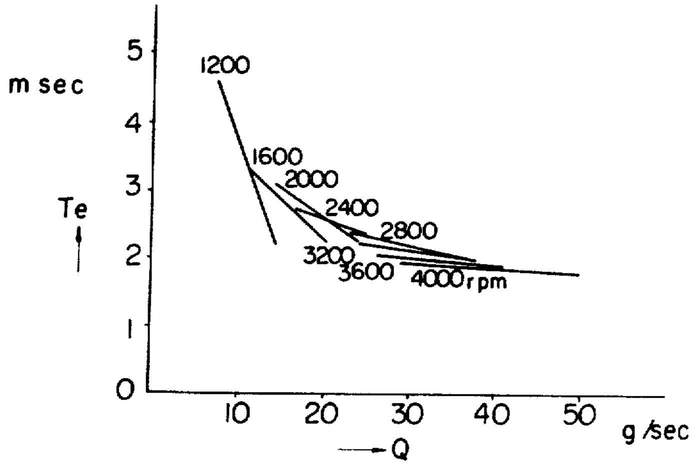
FIG. 5*c* is a graph of a spark-advance time period $T_e$ versus amount Q of air sucked into the engine.

According to the above-mentioned algorithm, an optimum spark-advance time period $T_e$, as shown in FIG. 5c, corresponds to a time period between an optimum ignition timing and top dead center. In other words, $T_e$ represents a time period which is obtained by converting an optimum spark-advance angle into a unit of time, in accordance with the rotational speed of the engine. Thereafter, computer 71 calculates a time period $T_a$, shown in FIG. 3-(F), between the ignition timing and a standard crank angle position, and feeds the down-counter 72 with a signal value $A_a$ which corresponds to the time period $T_a$ divided by a period of the clock pulses (12.5 μsec).

The calculation concerning a time period of supplying current to the ignition coil primary winding by the digital computer 71 will now be described with reference to the flow diagram shown in FIG. 4.

At a point 100 of the program, the digital computer 71 reads out the voltage signal $V_b$ from the latch circuit 63, and then, at a point 101, calculates a maximum value $T_{onmax}$ of the time period of supplying current to the ignition coil primary winding (hereinafter called as a maximum on-current period $T_{onmax}$) by using the following equation:

$$T_{onmax} = \frac{15}{V_b - 7} + 2.2$$

On the other hand, at a point 102 of the program, the computer 71 calculates the number CHRPM of the clock pulses having a period of 12.5 μsec, which are generated within a time period required by the crank shaft to rotate at a crank angle of 120°. This calculation is carried out based on the actual rotational speed N of the engine, by using the following equation:

$$CHRPM = 80{,}000/N$$

Then, at a point 103, the computer 71 calculates an optimum on-current period $T_{on}$ at the actual rotational speed and the actual voltage applied to the ignition coil primary winding from the equation:

$$T_{on} = \frac{-3667}{CHRPM + 6.5V_b + 199} - 0.25V_b + 14.5$$

At a point 104, whether the on-current period $T_{on}$ obtained at the point 103 is smaller than or equal to the maximum on-current period $T_{onmax}$ obtained at the point 101 is judged. If the on-current period $T_{on}$ is $T_{on} \leqq T_{onmax}$, the program proceeds to a point 106. If the on-current period $T_{on}$ is $T_{on} > T_{onmax}$, the on-current period $T_{on}$ is made equal to the maximum on-current period $T_{onmax}$ at the point 105, and then, the program proceeds to the point 106.

Figure 6:
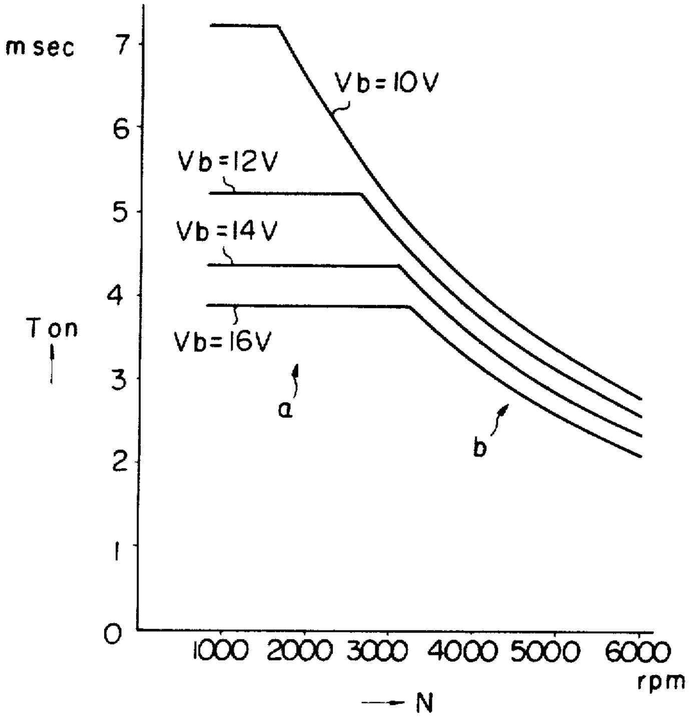
FIG. 6 is a graph of the desired time period $T_{on}$ of supplying current to the primary winding of the ignition coil versus rotational speed N of the engine.

According to the above-mentioned procedures of the program from the points 100 to 105, the optimum on-current period $T_{on}$ as a function of the rotational speed N and of the applied voltage $V_b$, as indicated in FIG. 6, is obtained. In FIG. 6, the linear line portion a is represented by the experimental equation used for the calculation at the point 101, and the non-linear line portion b is represented by the experimental equation used for the calculation at the point 103.

The digital computer 71 calculates a number $A_{on}$ of the clock pulses, having a period of 12.5 μsec, which appear during the on-current period $T_{on}$, in other words, calculates the number $A_{on}$ from the equation:

$$A_{on} = T_{on}/12.5\ (\mu sec).$$

Then, the computer 71 calculates a number $A_{off}$ of the clock pulses having a period of 12.5 μsec, which appear during the off-current period $T_{off}$, from the following equation, at a point 107:

$$A_{off} = 2CHRPM - A_{on}$$

This equation can be easily derived because the ignition in each cylinder of the engine occurs at an interval of the crank angle of 120°.

Then, at points 108 and 109, computer 71 limits the off-current period $T_{off}$ to not less than a predetermined value, for example, 0.6 msec. According to this procedure, no current is supplied to the ignition coil for a predetermined period after ignition, so that enough time for firing the air-fuel mixture in the cylinder can be obtained. In practice, the computer 71 compares the number $A_{off}$ with the quotient of 0.6 msec/12.5 μsec at the point 108, and then, if the number $A_{off}$ is less than the above-mentioned quotient, this $A_{off}$ is made equal to the quotient of 0.6 msec/12.5 μsec, at the point 109.

Thereafter, at a point 110, the computer 71 calculates a value $A_b$ of the time period $T_b$ (shown in FIG. 3-(G)) divided by a period (12.5 μsec) of the clock pulse, from the following equation:

$$A_b = A_a + A_{off}$$

The calculated value $A_b$ is fed to and preset in down-counter 73.

The down-counter 72 and 73 start the operation of counting the number of the clock pulses fed from the clock signal generator 41 when the output of $Q_3$ is fed from the decade counter 46, in other words, when the crank shaft rotates to the standard crank angle position. When the counted number reaches a figure equal to the preset value $A_a$ fed from the digital computer 71, the down-counter 72 stops the counting operation and simultaneously generates a pulse signal. That is, as shown in FIG. 3-(F), the down-counter 72 generates a pulse signal at the time a delay occurs at the time period $T_a$ from the standard crank angle position, and the flip-flop 81 is set by this pulse signal. As a result, the driving circuit 82 operates so that a primary current fed to the primary winding of the ignition coil 91 is cut off.

On the other hand, when the counted number reaches a figure equal to the preset value $A_b$ fed from the computer 71, the down-counter 73 stops the counting operation and simultaneously generates a pulse signal. As shown in FIG. 3-(G), down-counter 73 generates a pulse signal at a time a delay occurs at the time period of $T_b$ from the standard crank angle position, and the flip-flop 81 is reset by this pulse signal. As a result, current flow through the primary winding is started.

When the primary current flow stops, as shown in FIG. 3-(H), a high voltage shown in FIG. 3-(I) is induced in the secondary winding of the ignition coil 91 and fed to the spark plugs 93 via the distributor 92 to cause a spark to jump the spark-plug gap.

It is apparent that various known algorithms for calculating an optimum ignition timing can be used with the ignition energy control method according to the present invention. For example, an optimum ignition timing can be calculated by using a mapping method instead of the algebraic function. Furthermore, a vacuum level signal or a throttle valve opening degree signal can be used instead of the intake air amount signal.

In the foregoing embodiment, the number of the clock pulses fed to the down-counters is employed as a unit of the various calculations. However, in these calculations, time or crank angle can be used as a unit.

In the embodiment shown in FIG. 2, an internal combustion engine having six cylinders is employed. However, the present invention can similarly be applied to embodiments in which a number of cylinders different from six are employed.

According to the present invention, the time period for supplying current to a primary winding of an ignition coil is calculated from an algebraic function in which the actual voltage applied to the ignition coil primary winding and the actual rotational speed of the engine are used as variables. In view of this teaching, an ignition control system which supplies the required ignition energy to the engine, irrespective of the change of the voltage applied to the ignition coil and irrespective of the change of the rotational speed of the engine, can be constructed by using a digital computer having small storage capacity. Thus, an ignition control system can be miniaturized and formed at a very low cost.

What is claimed is:

1. A method for controlling ignition energy in a rotating internal combustion engine, the internal combustion engine being of the type having at least one ignition coil, the ignition coil having a primary winding, the method comprising the steps of:

generating a first signal containing information which is responsive to the rate of rotation of the internal combustion engine, said first signal information being periodic with respect to the rotation of the internal combustion engine;

generating a second signal containing information responsive to the magnitude of a supply voltage which is applied to the primary winding of the ignition coil;

generating a third signal containing information which is responsive to a rate at which air is drawn into the internal combustion engine;

generating a fourth signal containing information which corresponds to an engine firing time, said fourth signal being produced in response to a calculation concerning said information contained in said first and third signals;

generating a fifth signal containing information which corresponds to a period of time during which current flows in the primary winding of the ignition coil, said fifth signal being produced in response to a calculation concerning said information contained in said first and second signals;

generating a sixth signal containing information which corresponds to a time of initiating current flow in the primary winding of the ignition coil, said sixth signal being generated in response to a calculation concerning said information contained in said fourth and fifth signals; and supplying a current to the primary winding of the ignition coil during an interval of time beginning at said time of initiating current flow to a time corresponding to said engine firing time.

2. The method of claim 1 wherein there is provided the further step of limiting said information in said fifth signal so as to correspondingly limit said period of time of current flow in the primary winding in the ignition coil, to a maximum time period.

3. The method of claim 1 wherein said limiting of said information in said fifth signal is responsive to said information in said second signal.

4. The method of claim 1 wherein said step of generating said fifth signal is performed in accordance with a predetermined mathematical relationship between said first and third signals.

5. The method of claim 4 wherein there is provided the further step of entering data corresponding to said predetermined mathematical relationship between said first and second signals into a memory.

* * * * *